United States Patent [19]

Midlang et al.

[11] Patent Number: 4,970,870
[45] Date of Patent: Nov. 20, 1990

[54] COMMANDS SYSTEM FOR ELECTRONIC REFRIGERATOR CONTROL

[75] Inventors: Brian M. Midlang, Cedar Rapids; David M. Christensen, Coralville, both of Iowa

[73] Assignee: Amana Refrigeration, Inc., Amana, Ill.

[21] Appl. No.: 432,440

[22] Filed: Nov. 6, 1989

[51] Int. Cl.$^5$ ...................... G05D 23/00; F25B 49/02
[52] U.S. Cl. ........................................ 62/126; 236/94; 364/189
[58] Field of Search ................. 62/126, 125, 127, 161, 62/162, 163, 164; 236/94; 165/11.1; 364/188, 189, 557

[56] References Cited

U.S. PATENT DOCUMENTS

| | | | |
|---|---|---|---|
| 4,358,932 | 11/1982 | Helfrich, Jr. | 62/130 X |
| 4,658,348 | 4/1987 | Flanagan et al. | 364/189 X |
| 4,831,226 | 5/1989 | Robeson et al. | 219/10.55 B |
| 4,853,693 | 8/1989 | Eaton-Williams | 364/557 X |
| 4,858,443 | 8/1989 | Denpou | 62/126 |

*Primary Examiner*—Harry B. Tanner
*Attorney, Agent, or Firm*—William R. Clark; Richard M. Sharkansky

[57] ABSTRACT

An input command system for an electronic refrigerator control wherein dedicated function keys are provided for inputting commands to the processor. The processor will not accept inputs from the dedicated function keys unless an enable key is pressed first. The enable key is hidden on the control panel so as to avoid unauthorized inputting of commands. Once enabled, the processor receives commands for a predetermined time period that is extended when commands are input.

12 Claims, 6 Drawing Sheets

COMMANDS SYSTEM FOR ELECTRONIC REFRIGERATOR CONTROL

BACKGROUND OF THE INVENTION

The field of the invention generally relates to an electronic control for a refrigerator, and more particularly relates to apparatus and method for imputting operational commands to such a control.

Refrigerators have been made to include electronic controls. Generally, these controls have a microprocessor on a circuit board with remote sensors such as door opening switches and thermal sensors that monitor the status of the refrigerator so as to provide a display of such as a warning to the homeowner. Further, some electronic controls provide for the imputting of electronic commands so as to alter the operation or mode of the refrigerator. For example, prior art electronic controls have included a control panel through which the operator is able to imput commands so as to make the refrigerator colder or warmer. A problem that can be encountered with such controls is that unauthorized individuals such as children can inadvertently or intentionally change the programmed parameters that determine the operating characteristics thereby placing the refrigerator into an adverse operating state. Further, if special provisions such as the input of a security code are required to enable the imputting of commands, the refrigerator control may be confusing to demonstrate in the showroom. Also, the control may be inadvertently left in the enabled state, or it may be automatically toggled to the disenabled state at an inappropriate time of training or instruction.

SUMMARY OF THE INVENTION

It is an object of the invention to provide improved apparatus and method for inputting commands to a refrigerator electronic control.

It is another object to provide a refrigerator control system that can readily be reprogrammed or altered in operating characteristics, but only by those who have been properly instructed.

It is another object to provide a control system wherein unauthorized access to the input command or programming feature is prevented.

It is another object to provide a control panel wherein the input command enable key is not visibly identified by a key pad.

It is a further object to provide a control panel that has a hidden enable key.

It is also an object to provide an electronic control that automatically returns to the input disabled mode. It is a further object that the duration of the enable mode be extended by providing input commands. For example, an object is to provide a timer that is reset each time a command is input such that the enable mode continues so long as commands are being input.

In accordance with the invention, these and other objects are provided by an electronic control for a refrigerator comprising an electronic processor and a control panel comprising operator actuable means for inputting commands to said electronic processor wherein the inputting means is normally disabled. The invention further includes means for enabling the inputting means for a predetemined time interval, wherein the time interval is extended by operator actuation of the inputting means. It is preferable that the inputting means comprise a plurality of switches each corresponding to a dedicated function. For example, one of the dedicated functions may be to change the set temperature for either the freezer or the refrigerator section. Another example of an input command is a mode of operation wherein the refrigerator is set to a predetermined temperature for a predetermined time interval. It is also preferable that the control panel comprise a graphics overlay or flexible face plate comprising means for identifying the location of the inputting means and means for hiding the location of the enabling means.

The invention may also be practiced by the method of inputting commands to an electronic processor of a refrigerator, comprising the steps of: enabling the input of operator commands through at least one input command switch for a predetermined time period in response to operator actuation of an enable key, and extending the period of enablement in response to operator actuation of at least one input command switch during the predetermined time period.

With such arrangement, the processor is only enabled to receive command inputs from the operator after the enable key has been pressed. The enable key is not identified by a key pad and, therefore, its location or even its existence is only known by those with prior instruction. Accordingly, the inputting of commands is generally restricted, and inadvertent or intentional tampering by others is prevented. Also, after the enable key is pressed, the inputting of commands is possible for a predetermined time period such as, for example, ten minutes, and then the processor automatically reverts to the mode where input commands are not accepted. The pressing of any command key, however, automatically extends the enablement period so that the processor will continue to accept inputs for as long as commands are being input. In other words, if the input command feature is being demonstrated in the showroom, the processor will not stop accepting inputs until the control has been inactive for some predetermined time period. Typical input commands are raising and lowering the set temperture of the freezer or refrigerator, entering a vacation mode of defrosting, initiating a MAX COOL mode of operation, or initiating a FAST FRZ mode of operation.

BRIEF DESCRIPTION OF THE DRAWINGS

The foregoing objects and advantages may be more fully understood by reading the description of the preferred embodiment with reference to the drawings wherein.

DESCRIPTION OF THE PREFERRED EMBODIMENTS

Figures 1, 2:
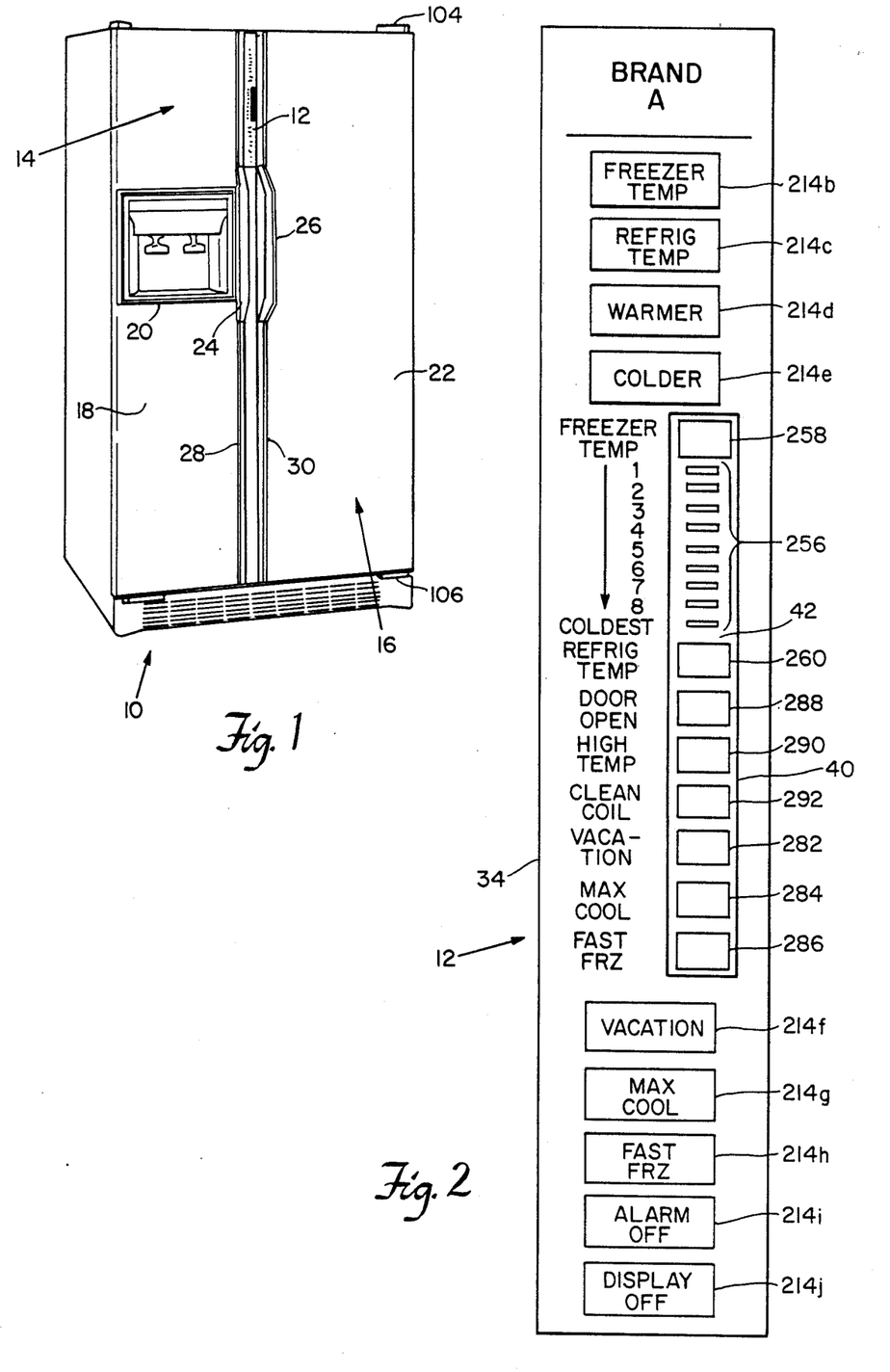
FIG. 1 is a perspective view of a refrigerator including an electronic control with a control panel.
FIG. 2 is an expanded view of the electronic control panel of FIG. 1.

Referring to FIG. 1, side-by-side refrigerator 10 is shown to include an electronic control panel 12. Although the invention could be used to advantage with refrigerators other than so-called side-by-side models, here the freezer section 14 or freezer is located on one side and the refrigerated food section 16 or refrigerator is located on the other side. Freezer 14 has a door 18 which includes an ice and water dispenser 20. Door 18 and door 22 of refrigerated food section 16 have respective handles 24 and 26. Both doors 18 and 22 have respective trim strips 28 and 30 or trim members that run vertically along the respective door edges so as to enhance the aesthetics of the refrigerator 10. Electronic control panel 12 is part of or an extension of trim strip 30 of door 22.

Referring to FIG. 2, an expanded view of the electronic control panel 12 is shown. As is conventional, electronic control panel 12 has a plurality of switches 212a–j (FIG. 4) that are located by corresponding touch or key pads 214b–j on a graphics overlay 34. Graphics overlay 34 also has a window 40 through which the visual display 42 (FIG. 3) of the electronic control board 36 can be viewed. The specific functions executed in response to the respective key pads 214b–j will be described in detail later herein.

Figure 3:
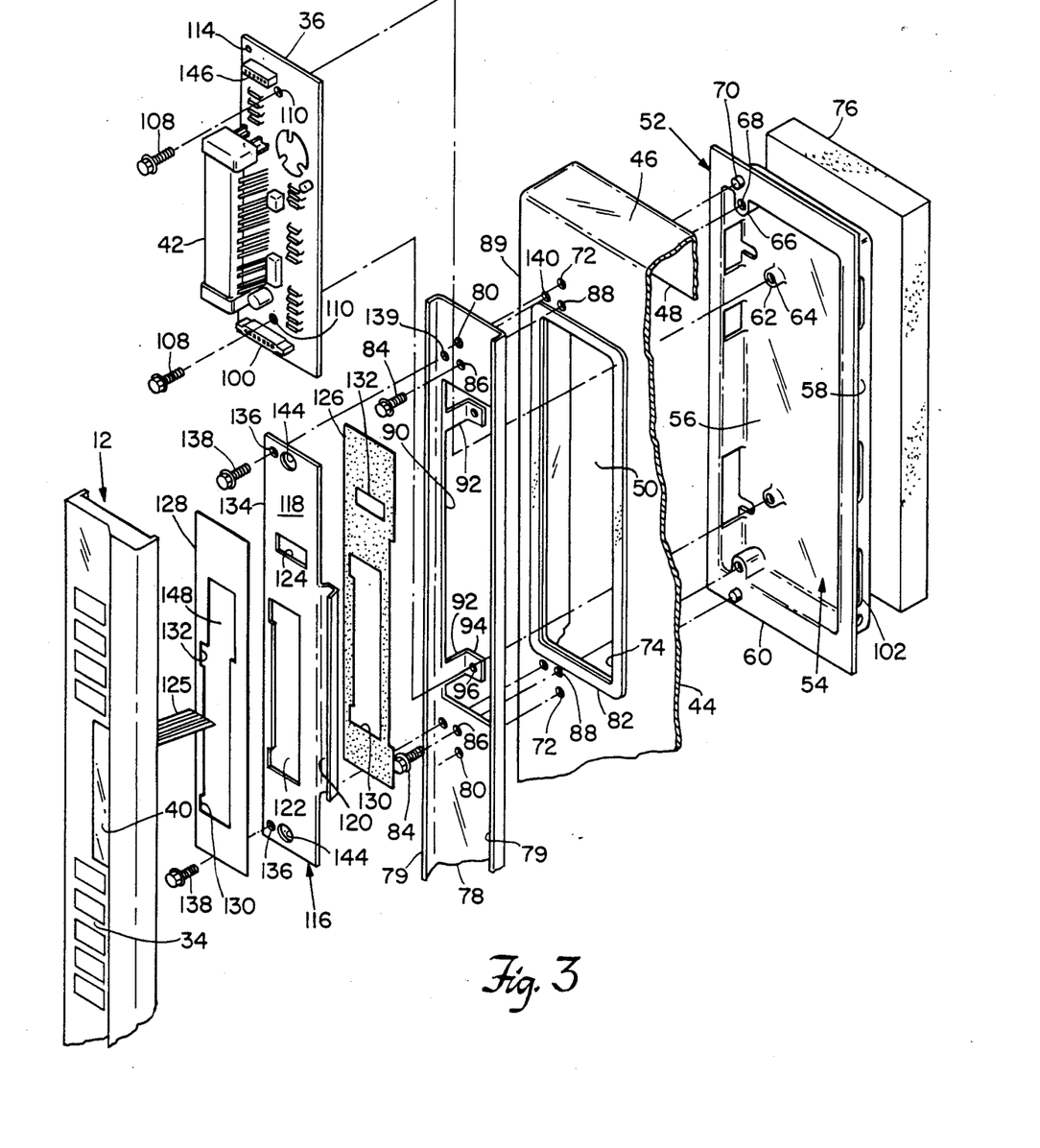
FIG. 3 is an exploded view of the parts used for mounting the electronic control into the refrigerator door.

Referring to FIG. 3, an exploded view of the assembly used to mount the electronic control board 36 in door 22 is shown. Door 22 has a front panel 44, a peripheral edge 46 of predetermined depth such as, for example, 1.5 inches, and an inwardly directed flange 48. As shown, door 22 has a vertically elongated aperture 50 adjacent to the upper-left corner. As will be described later herein, vertical trim strip 30 including electronic control panel 12 covers over aperture 50. Accordingly, the width of aperture 50 is constrained to be relatively narrow such as, for example, 1.5 inches. The height of aperture 50 is not so constrained and accordingly may preferably be 9 or 10 inches. Tub 52 forms a compartment 54 inside of door 22 in which electronic control board 36 is subsequently mounted. Tub 52 or housing, which is a flame rated plastic molded part, includes a bottom 56, sidewalls 58, and an outwardly extending flange 60 or rim. Typical dimensions of compartment 54 may be 11.25"H×3.25"W×¾"D making it wider than aperture 50 through which electronic control board 36 is inserted. That is, the lateral width of electronic control board 36 may perferably be wider than aperture 50, but compartment 54 is made wide enough so as to suitably mount electronic control board 36 therein. Bottom 56 has raised bosses 62 with screw holes 64 which, as it will be described, are used for mounting electronic control board 36 in compartment 54 spaced from bottom 56. Projecting into compartment 54 from top and bottom sidewalls 58 are respective bosses 66 with screw holes 68. Also, locator pins 70 project forwardly from top and bottom flanges 60 of tub 52. Locator pins 70 and bosses 66 are not centered on tub 52, but rather are located closer to the left side such as, for example, spaced approximately ¾" therefrom.

In fabrication, tub 52 is inserted inside of flange 48 from the backside of panel 44, and pushed laterally to the side and upwardly until locator pins 70 align with and insert into corresponding locator holes 72 in panel 44 above and below aperture 50. In this position, locator pins 70 accurately fix the horizontal and vertical alignment of tub 52 with respect to panel 44. Flange 60 seats flushy against peripheral portions of aperture 50 on the backside of panel 44 and forms compartment 54 that extends laterally from the inside edge 74 of aperture 50, and preferably extends 1.5" to 2" to the right of right edge 74 of aperture 50. In other words, compartment 54 formed behind panel 44 is laterally larger than aperture 50 and extends to the right beyond the right edge 74 of aperture 50. As will be aparent later herein, compartment 50 is wide enough so as to house control board 36. Next, a slab 76 of rigid polyurethane foam approximately the same size as tub 52 is inserted between the back of tub 52 and flange 48 so as to hold tub 52 temporarily in place during assembly. The thickness of slab 76 is approximtely the difference between the depth of peripheral edge 46 of door 22 and the depth of tub 52 so that flange 48 holds one side and the top of slab 76 and tub 52 in an interference or friction fit. For example, if peripheral edge 46 is 1½" and tub has a depth of 1", slab would have a thickness of approximately ½".

Trim retainer 78 is a vertically elongated trim mounting bracket that is affixed along the edge of door 22 and its side rails 79 are subsequently used to clip or snap lock trim member 30 in conventional manner. Trim retainer 78 has a pair of locator holes 80 that align with respective locator pins 70 of tub 52 that project forwardly through locator holes 72 of door 22. That is, when trim retainer 78 is initially being seated against the front of panel 44, it is positioned so that locator pins 70 insert through locator holes 80, thereby fixing the vertical and horizontal alignment of trim retainer 78 to panel 44 and tub 52. Before seating trim retainer 78 flushly against the front of panel 44, resilient retainer gasket 82 is positioned so as to surround aperture 50 and be compressed between trim retainer 78 and panel 44. Accordingly, retainer gasket 82, which may preferably be made of polyethylene with pressure sensitive adhesive on both side, provides a substantially airtight seal between trim retainer 78 and front panel 44 so as to prevent moisture from migrating to the inside of door 22. Trim retainer 78 is then secured to panel 44 by driving screws 84 through holes 88 and 86 in trim retainer 78 and panel 44 respectively, and anchoring the screws 84 in screw holes 68 of tub 52. Accordingly, trim retainer 78, panel 44, and tub 52 are securely affixed to each other, and the alignment to each other is presicely fixed by locator pins 70. Once the alignment of trim retainer 78 is set, the lower portion of trim retainer 78 may be screwed to panel 44 down along the side 89.

Trim retainer 78 has an aperture 90 that aligns with aperture 50 of panel 44, and a pair of tabs 92 project from the left edge of aperture 90 down through aperture 50 into compartment 54 of tub 52. Each tab 92 has a right angle bend terminating in a lateral platform 94 with a screw hole 96.

Figure 4:
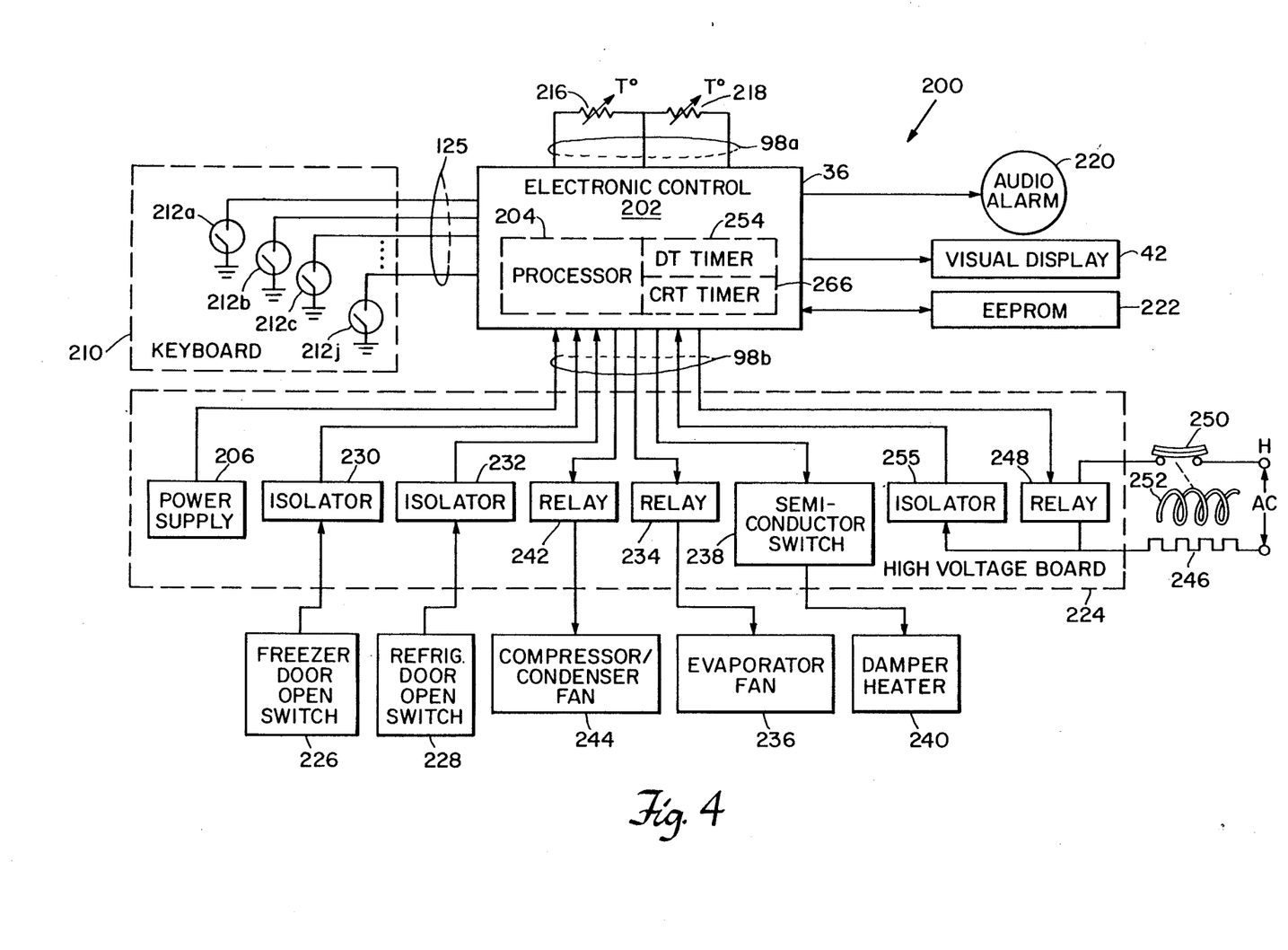
FIG. 4 is a block diagram of the control circuit of the refrigerator.

In the assembly procedure, the electronic circuit control board 36 is next inserted into compartment 54 through aperture 90 and 50. First, however, a cable harness 98a and b (FIG. 4) is drawn through slot 102 in sidewall 58 of tub 52 and connected to connector 100 of control board 36. Both cable harness sections 98a and b run along the backside of panel 44 inside of door 22. Section 98a is routed through the top hinge 104 of door 22 and includes three leads—one for refrigerator thermister 218, one for freezer thermister 216, and a common as shown in FIG. 4. Section 98b is routed through the bottom hinge 106 and is connected to the high voltage board 224 (FIG. 4) located below the refrigerated food section 16. In a preferred embodiment, electronic control board 36 has dimensions of 8½"×2½" making it wider than aperture 50, here 1½". Accordingly, control board 36 is held in front to back alignment and inserted edge first through apertures 90 and 50. Then, control board 36 is rotated about its vertical axis as it progresses through aperture 50 until it is inside compartment 54 with its right edge extending in compartment 54 to the right or past the right edge 74 of aperture 50. Then, screws 108 are driven through respective holes 110 in control board 36 and anchored into screw holes 64 of bosses 62. In such arrangement, screw bosses 62 space control board 36 from the bottom 56 of tub 52. The left side of circuit board 36 seats down against platforms 94 of tabs 92 thereby further insuring lateral alignment of circuit board 36. Optionally, screws may be inserted through screw holes 114 in control board 36 to aligned screw holes 96 of respective platforms 94. In this arrangement, the position and orientation of control board 36 is fixed with respect to trim retainer 78.

Control board 36 has a visual display 42 preferably of the vacuum fluorescent display type, spaced from control board 36, and due to the heretofore described alignment of control board 36 to trim retainer 78, visual display 42 is accurately and precisely located in and with repect to apertures 50 and 90.

Still referring to FIG. 3, support bracket 116 includes a flat plate 118 having a U-shaped channel 120 or lever extending from a midportion of the right side. The plate 118 has a vertically elongated slot 122 sized to receive visual display 42. Further, plate 118 has a second slot 124 for passing conductor ribbon 125, from electronic control panel 12 to control board 36 as will be described hereinafter. Resilient gaskets 126 and 128 each have adhesive on one side and are affixed to opposite sides of plate 118. Gaskets 126 and 128 each have cut-out portions 130 and 132 conforming to slots 122 and 124.

In assembly, the edge with U-shaped channel 120 or lever is inserted into apertures 90 and 50 and moved rightwardly such that U-shaped channel 120 is positioned behind the right edge 74 of aperture 50. Then, the left edge 134 of plate 118 is moved rearwardly. Notches 144 are provided to receive the heads of screws 84 si that plate 118 can be positioned flushly against trim retainer 78. As the left edge 134 of plate 118 is moved forwardly, U-shaped channel 120 or lever moves forwardly until it seats against the right backside portion of panel 44 peripheral to aperture 50. The presence of lever 120 behind panel 44 prevents oil canning of panel 44 adjacent to aperture 50. In such position, screws 138 are driven into respective holes 136 and 139 and are anchored in screw holes 140 of panel 44. Screws 138 are tightened so that trim retainer and gasket 126 are tightly sandwiched between support bracket 116 and panel 44. As a result, an airtight seal is formed around the edges of aperture 50 so as to prevent moisture from leaking to the inside of the door 22. With such an arrangement, visual display 42 is precisely aligned in slot 122. The alignment is precisely fixed because the tub 52 and thus the control board 36 are precisely located with respect to panel 44, as are the trim retainer 78 and support bracket 116. In addition to providing a sandwiched seal to make the edge of aperture 50 airtight, and also preventing panel 44 from oil canning, support bracket 116 serves an additional function. That is, plate 118 of support bracket 116 also provides a flame barrier between control board 36 and control panel 12 which may not necessarily be a flame rated part. In other words, control board 36 is completely enclosed by support bracket 116 which is metal and tub 52 which is a flame rated part.

In the next step of assembly, conductor ribbon 125 is inserted through slot 124 and connected to ribbon connector 146. Then, control panel 12 is snapped to trim retainer 78 in conventional manner such that control panel 12 covers trim retainer 78. In the preferred embodiment, trim retainer 78 has side rails 79 and control panel 12 has integrally formed clips (not shown) that snap over the outside of rails 79.

The graphics overlay 34 of control panel 12 has a transparent window 40 that aligns precisely over visual display 42 such that visual display 42 can easily be viewed through control panel 12. More specifically, control panel 12 is precisely located both vertically and horizontally with respect to trim retainer 78 which, as described heretofore, is precisely located with respect to visual display 42. Accordingly, the above described arrangement of parts guarantees the centering of visual display 42 with respect to window 40 in the graphics overlay 34. As will be described, control panel 12 includes keyboard 210 (FIG. 4) that has membrane switches 212a–j that are interconnected to conductor ribbon 125 and a graphics overlay 34 that includes labeled touch pads or key pads 214b–j that identify the location of membrane switches 212b–j. The portion 148 of gasket 128 that aligns between slots 122 and 124 is cut out so as to provide a space between control panel 12 and support bracket 116 in which conductor ribbon 125 is routed when control panel 12 is tightly affixed over support bracket 116. Gasket 128, however, has a continuous outer perimeter which is compressed between control panel 12 and support bracket 116, thereby providing an airtight seal. Accordingly, moisture is prevented from migrating to the inside of door 22 through aperture 50.

Door 22 is then filled with fiberglass insulation (not shown) and the inner liner (not shown) is installed. The door is then ready for hanging on refrigerator 10. In an alternate embodiment, door 22 could be foamed-in-place.

Referring to FIG. 4, the control circuit 200 for refrigerator 10 includes electronic control 202 which is mounted on control board 36 in door 22. Electronic control 202 includes processor 204 which preferably is a microcomputer that functions as a digital microprocessor and is programmed in accordance with well-known principles so as to execute the operational functions to be described subsequently herein. Control 202 also includes conventional circuits that are used to interface the various blocks and devices as shown in FIG. 4. Control 202 is a low voltage device and receives power from power supply 206 through cable harness 98b.

Keyboard 210 or switchboard of control panel 12 includes a plurality of switches 212a–j that are connected to input/output ports of processor 204 so that processor 204 will be able to recognize when any one of switches 212–j has been pressed to its closed position. Preferably, switches 212a–j are membrane swithches, and switches 212b–j are positioned behind respective key pads 214b–j of graphics overlay 34 (FIG. 2) which is a flexible face plate. As shown, conductor ribbon 125 interconnects keyboard 210 with control 202.

Freezer thermister 216 and refrigerator thermister 218 are suitably positioned in the freezer section 14 and refrigerated food section 16, respectively. As is well known, the resistances of thermisters 216 and 218 change as a function of temperature, and electronic control 202 senses these resistances so as to determine the temperatures inside the freezer section 14 and the refrigerated food section 16. Audio alarm 220 is mounted on control board 36, and is used by control 202 to give audio warnings to the operator. As described heretofore, visual display 42 which preferably is a vacuum fluorescent display, is mounted to control board 36 and is spaced therefrom. Visual display 42 is visible through window 40 of graphics overlay 34. EEPROM 222 is also mounted on control board 36 and, as will be described subsequently, is used to store programmable parameters of refrigerator 10.

High voltage board 224 is remotely located from electronic control 202 under the refrigerated food section 16, and the two are interconnected by cable harness 98b through which electronic control 202 receives various inputs and transmits various control signals. For example, freezer door open switch 226 and refrigerator door open switch 228 provide the open status of freezer door 18 and refrigerator door 22 to processor 204 through respective isolators 230 and 232. That is, processor 204 senses whether either door 18 or 22 is left open or ajar. Further, in response to a refrigerator cut-in temperature as sensed by refrigerator thermister 281, processor 204 controls relay 234 to turn on the evaporator fan 236 and also closes semiconductor switch 238 so as to turn on damper heater 240 and open the damper. Also, in response to a freezer cut-in temperature as sensed by thermister 216, processor 204 closes relays 242 and 234 so as to activate the compressor/condenser fan 244 and evaporator fan 236.

Figure 5:
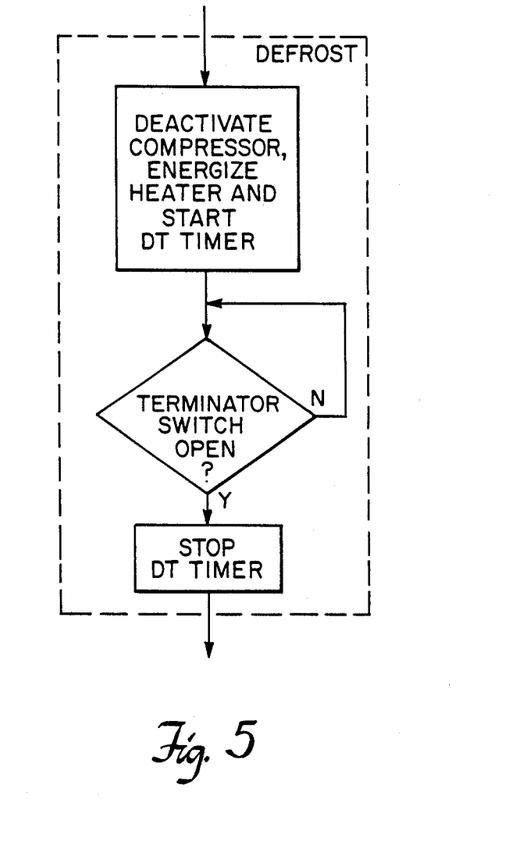
FIG. 5 is a flow diagram of a defrost cycle.

With reference to FIG. 5, processor 204 also controls defrost cycles. More specifically, processor 204 will DEACTIVATE COMPRESSOR, ENERGIZE HEATER AND START DT TIMER in order to initiate a defrost cycle. That is, after compressor 244 is deactivated, evaporator heater 246 is energized by closing relay 248. This connects 120 volts AC across the series of evaporator heater 246 and terminator switch 250 which is a temperature sensitive bimetallic switch. Accordingly, the evaporator heater 246 which is coupled to the evaporator 252 melts the ice on evaporator 252. During the defrost cycle, processor 204 continuously monitors the output of isolator 255 to determine if TERMINATOR SWITCH OPEN? More specifically, when the ice or frost is gone from evaporator 252, the evaporator 252 starts to heat up until it raises to a predetermined temperature at which defrost terminator switch 250 opens up thereby breaking the current flow through heater 246. Isolator 255 provides processor 204 with a signal indicating when current stops flowing through heater 246. Thus, isolator 255 provides an indication of when terminator switch 250 has opened thereby indicating that the defrost cycle has terminated. In response to terminator switch 250 opening, processor 204 will open relay 248 and STOP DT TIMER. More specifically, processor 204 starts DT TIMER 254 running when the heater 246 is energized and stops DT TIMER 254 when terminator switch 250 opens and thereby obtains a measure of the defrost time DT that is related to the amount of ice or frost that collected on evaporator 252.

Referring again to FIG. 2 and also to FIG. 4, the operation of electronic control 202 will be further described with reference to control panel 12. The enable switch 212a or key is used to enable all of the other keys 212b-j with the exception of the ALARM OFF switch 212i or key which is always enabled. That is, unless the enable switch 212a is first depressed, processor 204 will not accept command inputs from the operator. More specifically, with reference to FIG. 7, pressing enable switch 212a on keyboard 210 of control panel 12 causes processor 204 to set 10-minute countdown timer 215 which, in turn, enables processor 204 to EXECUTE COMMAND INPUTS. That is, processor 204 will receive and execute command inputs from switches 212b-h and j when timer 215 is counting; otherwise, the command inputs will not be accepted. Processor also monitors to see if there is a COMMAND INPUT? and, anytime there is, 10-minute countdown timer 215 is reset. Accordingly, once enable switch 212a is pressed, all of the other switches 212b-h and j remain active for operator input commands for a period of 10 minutes from the time the last switch 212a-j was pressed. In other words, once the input of commands is enabled by enable switch 212a, it remains enabled until switches 212a-j are inactive for 10 continuous minutes. Extending the 10 minute window of enablement from the time any switch 212a-j has been pressed permits lengthy instruction sessions both in the home and in the showroom when a sales person is demonstrating the input command feature. It could be confusing if processor 204 went into a disenabled state during a training session. Once there has been 10 minutes of switch inactivity and 10 minute countdown timer 215 has timed out thereby removing the enable for command inputs, timer 215 can only be set again by enable switch 212a; that is, timer 215 will not be reset by pressing switches 212b-j because these commands are enabled only when timer 215 is counting down.

Figure 7:
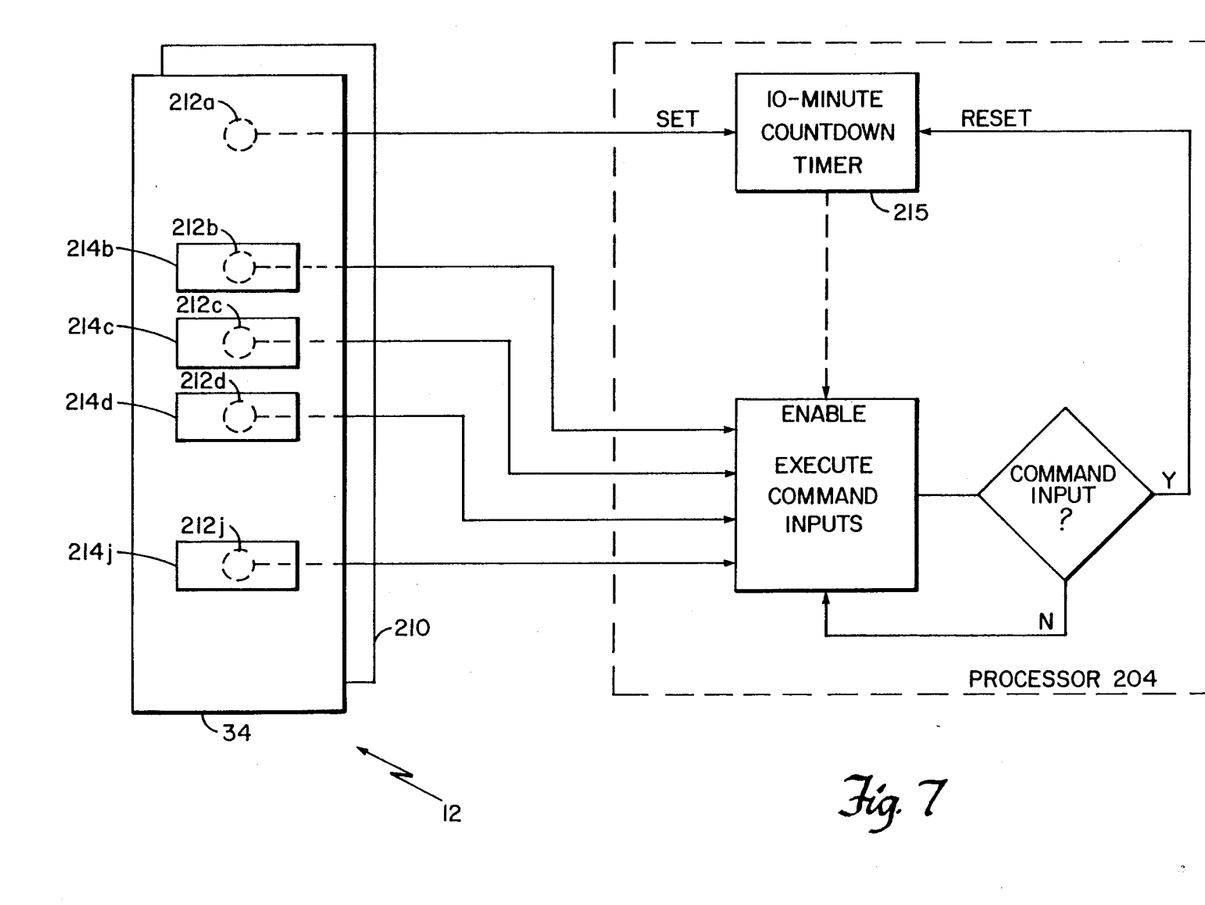
FIG. 7 is a diagram depicting the inputting of operational commands.

Still referring to FIG. 7, keyboard switches 212b-j have corresponding indicia of key pads 214b-j or touch pads on graphics overlay 34 so as to indicate where to press in order to activate the respective switches 212b-j and functions. However, enable switch 212a has no corresponding indicia on graphics overlay 34 to locate it. In other words, the location or even the existence of the enable switch 212a is not readily apparent to the uninformed user. This limits the inputting of commands to those users who are authorized, and avoids inadvertent or unintentional tampering by others such as by children. The location of enable switch 212a may be indicated by some unrelated symbol which is not conventionally identifiable as a key pad; in FIG. 2, the unrelated symbol in BRAND A.

In the normal mode of operation, the temperature level portion 256 of visual display 42 indicates the present temperature setting of either the freezer section 14 or the refrigerated food section 16. The freezer 14 or frozen section and the refrigerator 16 or fresh food section can be set to any one of nine possible temperature levels from 1-9 (coldest) as shown in the table below:

TABLE

| LEVEL | FRESH FOOD | | FROZEN FOOD | |
|---|---|---|---|---|
| | CUT-IN °F. | CUT-OUT °F. | CUT-IN °F. | CUT-OUT °F. |
| 1 | 48 | 43 | 14 | 2 |
| 2 | 46 | 41 | 12 | 0 |
| 3 | 44 | 39 | 10 | −2 |
| 4 | 43 | 38 | 9 | −3 |
| 5 | 42 | 37 | 8 | −4 |
| 6 | 41 | 36 | 7 | −5 |
| 7 | 40 | 35 | 6 | −6 |

TABLE-continued

| LEVEL | FRESH FOOD | | FROZEN FOOD | |
|---|---|---|---|---|
| | CUT-IN °F. | CUT-OUT °F. | CUT-IN °F. | CUT-OUT °F. |
| 8 | 38 | 33 | 4 | −8 |
| 9 | 36 | 31 | 2 | −10 |
| FAST FRZ | | | 2 | −10 |
| MAX COOL | 36 | 31 | | |

For example, if the freezer 14 is set at level 7, then processor 204 will cause the compressor 244 to cut in or be activated when the temperature of the freezer section 14 as sensed by thermister 216 is +6° F., and processor 204 will cause compressor 244 to be cut out or deactivated when the temperature drops to −6° F. FREEZER TEMP light 258 and REFRIG TEMP light 260 indicate whether the temperature level portion 256 is displaying the freezer 14 or refrigerator 16 temperature. To raise the setting temperature of the displayed section (freezer or refrigerator), the WARMER key pad 214d is pressed and the level as indicated by the temperature level portion 256 is raised one step at a time. If WARMER key pad 214d is continuely pressed, the setting will sequence through the levels at an accelerated rate. Conversely, the COLDER key pad 214e is used to change the temperature setting to a lower temperature. FREEZER TEMP key pad 214b and REFRIG TEMP key pad 214c are used to change the parameter displayed in temperature level portion 256 and the command input of WARMER and COLDER key pads 214d and e, respectively, from refrigerator to freezer and vice versa.

Figure 6:
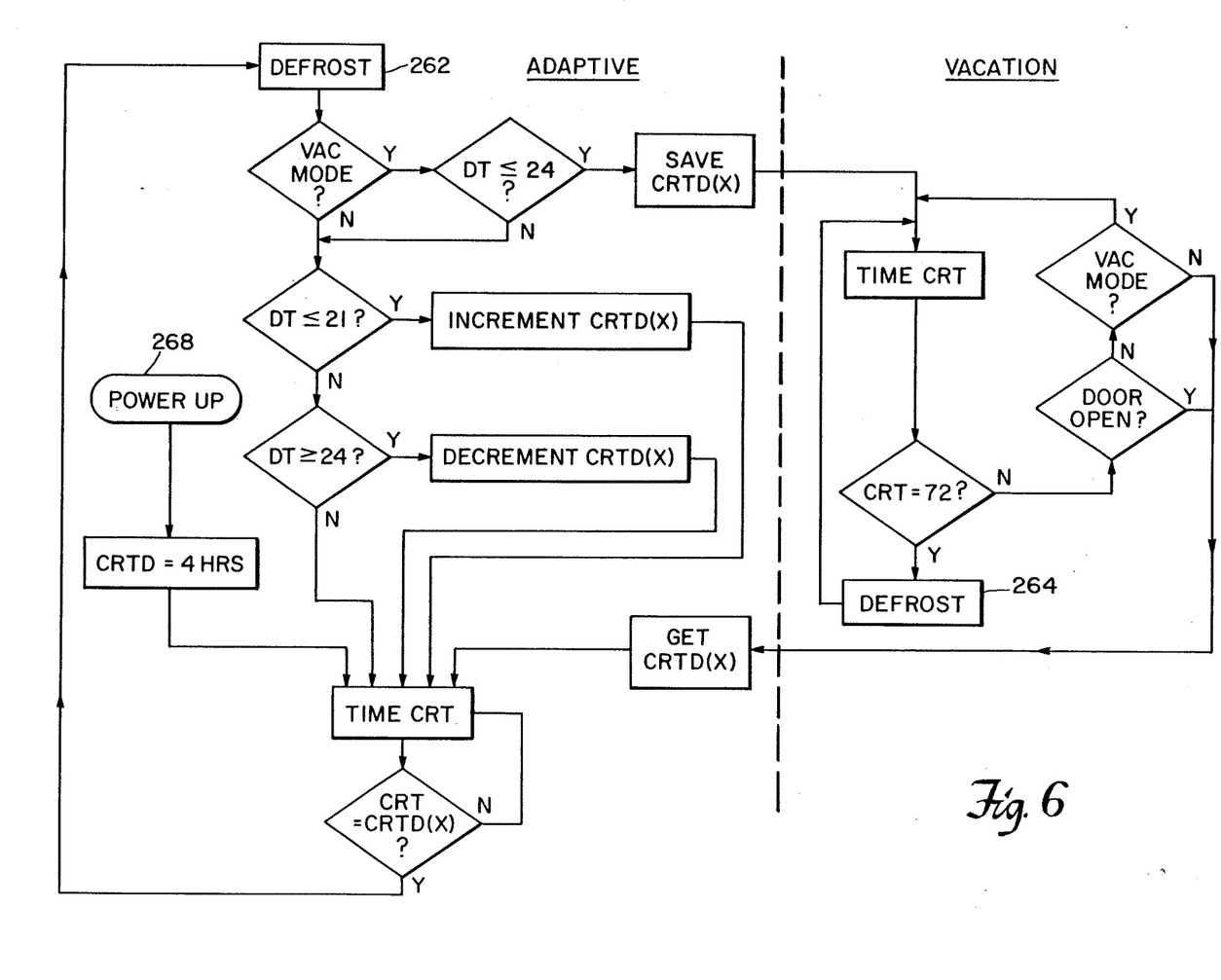
FIG. 6 is a flow diagram of the adaptive and vacation modes of determining the intervals between defrost cycles.

Still referring to FIG. 2, VACATION key pad 214f is used to increase the number of compressor run time hours between defrost cycles, thereby providing operation that is more advantageous and economical when the refrigerator is not being used for extended periods of time. First, however, the normal or adaptive mode of determining the interval between defrost cycles will be described with referenced to FIG. 6. DEFROST blocks 262 and 264 indicate the execution of a defrost cycle as described with reference to FIG. 5. That is, after a defrost cycle is initiated, the evaporator heater 246 is energized, and DT timer 254 is used to measure the on time of the heater 246 until the terminator switch 250 opens thereby terminating the defrost cycle. With the exception of DEFROST blocks 262 and 264, the other steps or blocks in FIG. 6 are used to determine how many compressor run time hours will elapse between defrost cycles. In the adaptive or normal defrost mode, a defrost cycle is initiated after a predetermined number of compressor run hours has elapsed from the last defrost cycle, and the number of hours changes or adapts depending upon the recent history of how long it takes for the defrost terminator switch 250 to open after the defrost heater 246 has been energized. In other words, the time interval DT to defrost is related to the amount of ice collected on evaporator 252, and the selected number of compressor run hours before the next defrost cycle is inversely related thereto. If there was a lot of ice on evaporator 252, then it is desirable to defrost again relatively soon; on the other hand, if there was little ice, then it is desirable to wait a relatively long time. Compressor run time CRT is the parameter measured or timed between defrost cycles, and CRT is accumulated in CRT timer 266. In other words, CRT timer 266 runs if and only if compressor 244 is activated.

In the normal or adaptive defrost mode of operation, the compressor run time between defrost (CRTD) will be one of three values: CRTD (1)=8 hours; CRTD (2)=12 hours; and CRTD (3)=16 hours. After DEFROST block 262 and assuming VACation MODE has not been selected, processor 204 checks to see if the defrost time DT for the last defrost was LO indicating a small accumulation of ice. That is, if DT≦21 minutes, then processor 204 will INCREMENT CRTD(X) to the next higher value unless it is already at the maximum CRTD (3). Alternatively, processor 204 checks to see if the defrost time DT for the last defrost was HI indicating a large defrost load. That is, if DT≧24 minutes, then processor 204 will DECREMENT CRTD(X) to the next lower value unless it is already at the minimum CRTD (1). If the defrost time DT for the last defrost was intermediate (e.g. 21<DT<24), then CRTD(X) is left unchanged. After CRTD(X) is set (i.e. 8, 12, or 16 hours), processor 204 will TIME CRT; that is, processor 204 will keep a running total of the compressor run time hours in CRT timer 266. Also, processor 204 monitors CRT timer 266 to see if CRT=CRTD(X)? When it is, another defrost cycle is initiated. In summary, CRTD(X) is updated according to an inverse relationship with the defrost time DT after each DEFROST 262, and then the compressor run time hours are timed for the selected number of hours (i.e. 8, 12, 16 hours) and then the next defrost cycle is executed. After POWER UP block 268, processor 204 initially sets CRTD=4 hours.

If VACATION key pad 214f is pressed, VACATION light 282 is illuminated, but CRTD(X) is initially left unchanged; the next DEFROST 262 cycle occurs as previously scheduled in accordance with the normal or adaptive defrost mode as it existed prior to VACATION key pad 214f being pressed. Then, after the next DEFROST 262, the program branches at VAC MODE? and processor 204 checks to see if DR≦24? If DT is not less than 24 minutes, it may be indicative that there is a component failure, malfunction, and the compressor run time between defrost is limited to the normal mode selections of CRTD(X) (i.e. 8, 12, or 16 hours) until a DEFROST 262 is executed in 24 minutes or less. Only then is a new energy saving CRTD established. First, however, processor 204 will SAVE CRTD(X) so that it can be used after returning from the vacation mode of defrost to the normal mode. Once in the vacation mode of defrosting, processor 204 will timer CRT. That is, the compressor run time is accumulated in CRT timer 266 until the condition of CRT=72? is satisfied. Then, DEFROST 264 is executed and another 72 hours of compress run time elapses before another DEFROST 264 is executed; the elapsed hours are not dependent on DT while monitoring to see if CRT=72?. Processor 204 also monitors to see if DOOR OPEN? or VAC MODE? That is, if either door 18 or 22 is opened indicating use of refrigerator 10, the defrost mode automatically returns from the fixed 72 hours if compressor run time to the adaptive or normal mode where the selected compressor run hours are inversely related to DT. Further, the vacation mode is exited if the VACATION key pad 214f is pressed so as to provide an interrupt to processor 204. Upon exiting the vacation mode, processor 204 will GET CRTD(X) that was stored. If CRT timer 266 already passed CRTD(X) in the vacation mode, DEFROST 262 will immediately be executed. Otherwise, processor will wait until CRT=CRTD(X). The VACATION light 282 is extinguished when leaving the vacation mode.

MAX COOL key pad 214g is used to put processor 204 into the MAX COOL mode wherein the refrigerator temperature setting will be set at level 9 or its coldest setting as shown in the above table for 10 hours or until the MAX COOL key pad 214g is pressed again. This mode is generally used when a large load of food has been added to refrigerator section 16. While in MAX COOL mode, the MAX COOL light 284 is illuminated.

FAST FRZ key pad 214h is used to put the processor 204 into the FAST FRZ mode wherein the freezer temperature setting will be set to level 9 or the coldest setting as shown in the above table for 24 hours or until the FAST FRZ key pad 214h is pressed again. This mode is generally used when a large load of food has been added to freezer section 14. While in the FAST FRZ mode, the FAST FRZ light 286 is illuminated.

As described earlier, processor 204 monitors whether doors 18 and 22 are open. If either is open, processor 204 illuminates DOOR OPEN light 288. If either door is continuously open for 3 minutes, DOOR OPEN light 288 is flashed and audio alarm 220 is energized. Closing the open door 18 or 22 will turn off the audio alarm 220 and DOOR OPEN light 288. ALARM OFF key pad 214i can be used to turn off the audio alarm 220. Processor 204 illuminates HIGH TEMP light 290 if the temperature of freezer 14 goes above 15° F. for a period of 2 continuous hours or refrigerator 16 goes above 60° F. for a period of 2 continuous hours. Under such circumstances, the FREEZER TEMP light 258 or REFRIG TEMP light 260 flashes on and off to indicate which has the high temperature, and also audio alarm 220 will be energized. ALARM OFF key pad 214i can be used to turn off the alarm. Processor 204 illuminates the CLEAN COIL light 292 after 3 months of time. The light is turned off automatically after 72 hours or upon pressing the ALARM OFF key pad 214i.

As described heretofore, ALARM OFF key pad 214i is used to turn off the alarms for HIGH TEMP and CLEAN COIL. Also, if ALARM OFF key pad 214i is pressed for 3 seconds, it will cause the door open audio alarm to toggle to an inoperative state.

DISPLAY OFF key pad 214j is used to turn the temperature level portion 256 of visual display 42 off.

Control panel 12 can also be used to reprogram the operation of processor 204. However, as will become apparent, the program ability feature is only for those with special training such as service technicians, and therefore access into the programming mode requires a highly unusual sequence of operator inputs that would only be known to those with prior instruction. As an example, access is here gained by pressing enable key 212a, opening a door 18 or 22, and then pressing the sequence of VACATION key pad 214f, MAX COOL 214g, FAST FRZ key pad 214h, MAX COOL key pad 214g, and FAST FRZ key pad 214h within 5 seconds. There are two possible programming modes—Mode A and Mode B—that can be cycled back and forth by pressing enable switch 212a. In Mode A, processor 204 sets the temperature level portion 256 so as to indicate the temperature read by freezer thermister 216 if the FREEZER TEMP light 258 is on, and read by the refrigerator thermister 218 if the REFRIG TEMP light 260 is on. To go from reading one to reading the other, the FREEZER TEMP key pad 214b or REFRIG TEMP key pad 214c is pushed as appropriate. The actual read temperature is displayed by indicating the tens digit in BCD using the top four temperature levels (1-4), and the ones digit in BCD using levels 5-8. The coldest level or level 9 is used to indicate whether the temperature is above or below 0° F. For example, when the coldest level is illuminated, it indicates that the temperature read by levels 1-8 is negative. It is noted that by displaying the temperature setting rather than the actual sensed temperature in the normal mode of operation (i.e. not program mode), concern and confusion, and therefore unnecessary service calls may be avoided. In this programming mode, however, the service technician may want to know the sensed temperature to check respective thermisters 216 and 218 and associated reading circuitry, or to calibrate the relationship between settings and sensed temperature by introducing offsets as will be described subsequently.

To enter program mode B, enable switch 212a is pressed and the CLEAN COIL light 292 is extinguished to indicate the passage from mode A. In mode B, operational parameters or variables of processor 204 can be reprogrammed or altered. For example, the frozen food temperatures as shown in the table may be offset. In order to effect this, the operator presses the FREEZER TEMP key pad 214b, and then the WARMER key pad 214d or COLDER key pad 214e are used to alter the offset as displayed in the temperature level portion 256. Here, indicator level 1 indicates a +8° F. offset nad indicator level 9 indicates −8° F. offset with 2° F. incremental steps therebetween. The fresh food temperatures as shown in the table may similarly be offset by first pressing the REFRIG TEMP key pad 214c.

Further, in mode B, the MAX COOL duration may be altered. In order effect this, the MAX COOL key pad 214g is first pressed, and then the WARMER key pad 214 d and COLDER key pad 214e are used to increase or decrease the duration. For example, indicator level 1 here indicates a 6 hour duration and indicator level 9 indicates a 22 hour duration with 2 hour increments therebetween. Similarly, the FAST FRZ duration may be altered by first pressing the FAST FRZ key pas 214 h. Indicator 1 corresponds to an 8 hour duration while indicator 9 indicates a 40 hour duration with 4 hour incremental steps therebetween. The parameters as input in programming mode B are stored in EE-PROM 222 and therefore are available after a power failure.

This concludes the description of the preferred enbodiment. However, a reading of it by one skilled in the art will bring to mind many alterations and modifications without departing from the spirit and scope of the invention. Therefore, it is intended that the scope of the invention be limited only by the appended claims.

What is claimed is:

1. An electronic control for a refrigerator, comprising:
    an electronic processor;
    a control panel comprising operator actuable means for inputting commands to said electronic processor, said inputting means normally being disabled; and
    said control panel further comprising means for enabling said inputting means for a predetermined time interval wherein said time interval is extended by operator actuation of said inputting means.

2. The control recited in claim 1 wherein said inputting means comprises a plurality of switches each corresponding to a dedicated function.

3. The control recited in claim 2 wherein one of said dedicated functions is raising the set temperature for said refrigerator.

4. The control recited in claim 2 wherein one of said dedicated functions is lowering the set temperature for said refrigerator.

5. The control recited in claim 2 wherein one of said dedicated functions is a mode wherein the set temperature for said refrigerator is lowered to a predetermined temperature for a predetermined time interval.

6. An electronic control for a refrigerator, comprising:
   an electronic processor;
   a control panel having at least one switch for inputting a command to said electronic processor; and
   means for enabling, for a predetermined time interval, the input of said command to said processor by operator actuation of said at least one switch wherein the enabled time interval is extended by actuation of said at least one switch during the enabled time interval.

7. The control recited in claim 6 wherein said predetermined time interval is approximately 10 minutes.

8. The control recited in claim 6 wherein the enabled time interval for entering said command by operator actuation of said at least one switch is extended until said at least one switch is inactive for a predetermined time interval.

9. The control recited in claim 6 wherein said control panel includes a switch board including said at least one switch and also a second switch, said control panel further comprising a flexible face plate covering said switch board, said face plate comprising indicia means for identifying the location of said one switch behind said face plate and for hiding the location of said second switch, said enabling means comprising said second switch.

10. The control recited in claim 9 wherein said indicia means comprises a key pad corresponding to the position of said one switch behind said face plate.

11. The control recited in claim 10 wherein said switch board comprises a plurality of other switches having corresponding key pads on said face plate for indentifying their respective locations.

12. The method of inputting commands to an electronic processor of a refrigerator, comprising the steps of:
   enabling the input of operator commands through at least one input command switch for a predetermined time period in response to operator actuation of enable switch; and
   extending the predetermined period of enablement in response to operator actuation of said at least one input command switch during the predetermined time period.

* * * * *